United States Patent [19]
Langmeser et al.

[11] Patent Number: 5,803,537
[45] Date of Patent: Sep. 8, 1998

[54] STORABLE VEHICLE ARM REST WITH IMPROVED LATCH BLOCK OUT

[75] Inventors: Walter Michael Langmeser, Macomb; James Bolsworth, Sterling Heights, both of Mich.

[73] Assignee: General Motors Corporation, Detroit, Mich.

[21] Appl. No.: 915,424

[22] Filed: Aug. 20, 1997

[51] Int. Cl.⁶ ..................................................... A47C 7/54
[52] U.S. Cl. ..................................... 297/188.19; 292/230
[58] Field of Search .............................. 297/113, 188.14, 297/188.19, 411.32; 292/230, DIG. 22

[56] References Cited

U.S. PATENT DOCUMENTS

| | | | |
|---|---|---|---|
| 2,723,746 | 11/1955 | Stevenson et al. | 292/230 X |
| 3,951,448 | 4/1976 | Hawie | 297/113 |
| 4,094,392 | 6/1978 | Gregg et al. | 190/41 R |
| 4,652,029 | 3/1987 | Yamamoto | 292/252 |
| 4,714,286 | 12/1987 | Yamamoto | 292/263 |
| 4,906,044 | 3/1990 | Wilstermann | 297/194 |
| 5,116,099 | 5/1992 | Kwasnik et al. | 297/188.19 X |
| 5,224,744 | 7/1993 | Michelutti | 292/230 X |

FOREIGN PATENT DOCUMENTS 4118127  12/1991  Germany ................ 292/230

*Primary Examiner*—Peter R. Brown
*Attorney, Agent, or Firm*—Patrick M. Griffin

[57] ABSTRACT

A compartment type, hollow vehicle seat arm rest having a pivoted, latchable lid in which the entire arm rest and latched lid can be raised to a stored position rotated past absolute vertical. The latch is a flat, spring loaded plunger that moves back and forth within a latch housing that is molded entirely within the thickness of the lid itself. A thin, flat flip lever is freely pivoted against the back of the housing, trapped between a notched undersurface of the plunger and a flat bottom wall of the latch housing. When the arm rest is raised, the flip lever moves past vertical and falls away from the flat housing bottom wall and into the notched undersurface of the plunger, blocking it from being pushed in to unlatch the lid.

3 Claims, 5 Drawing Sheets

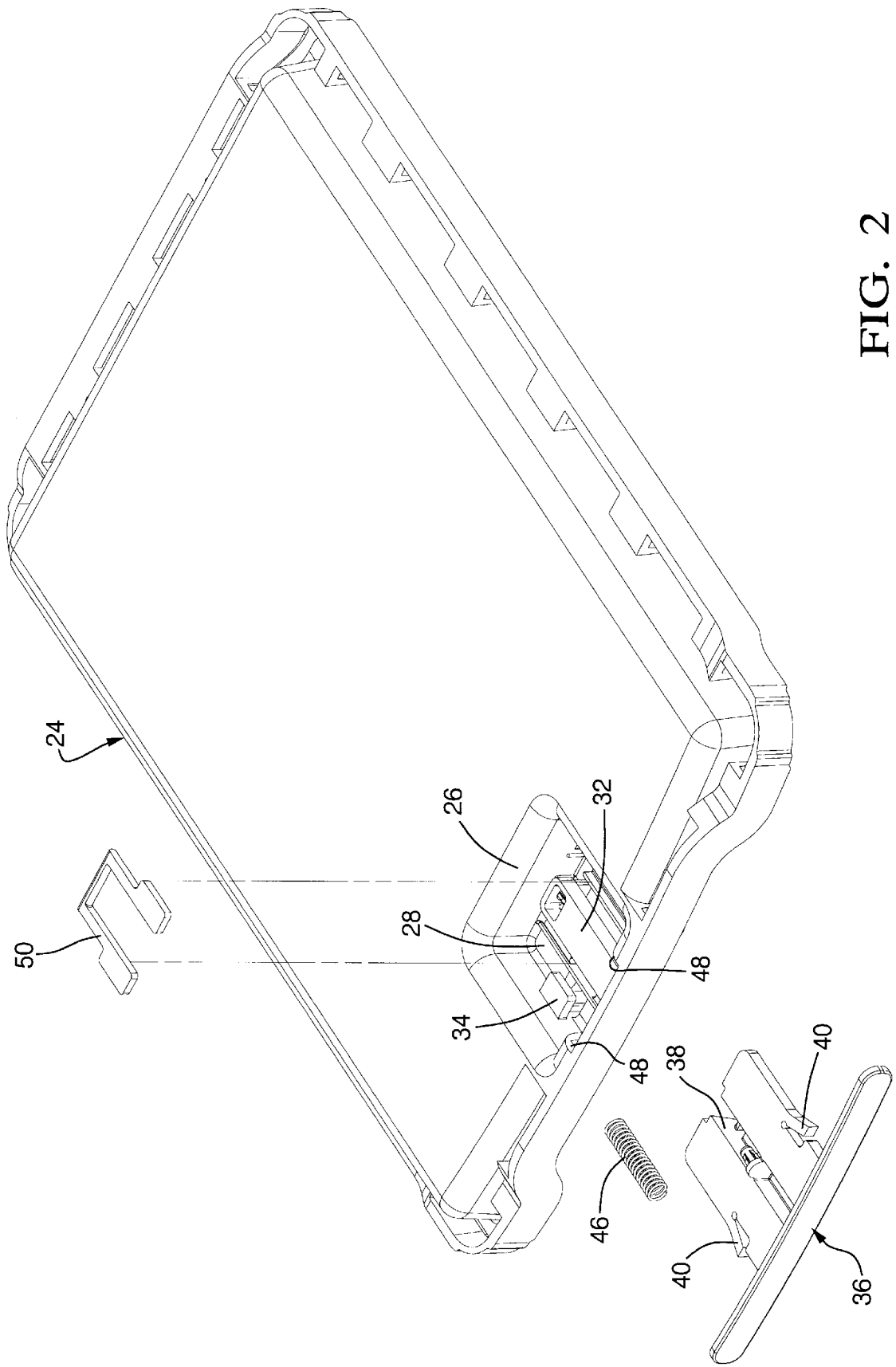

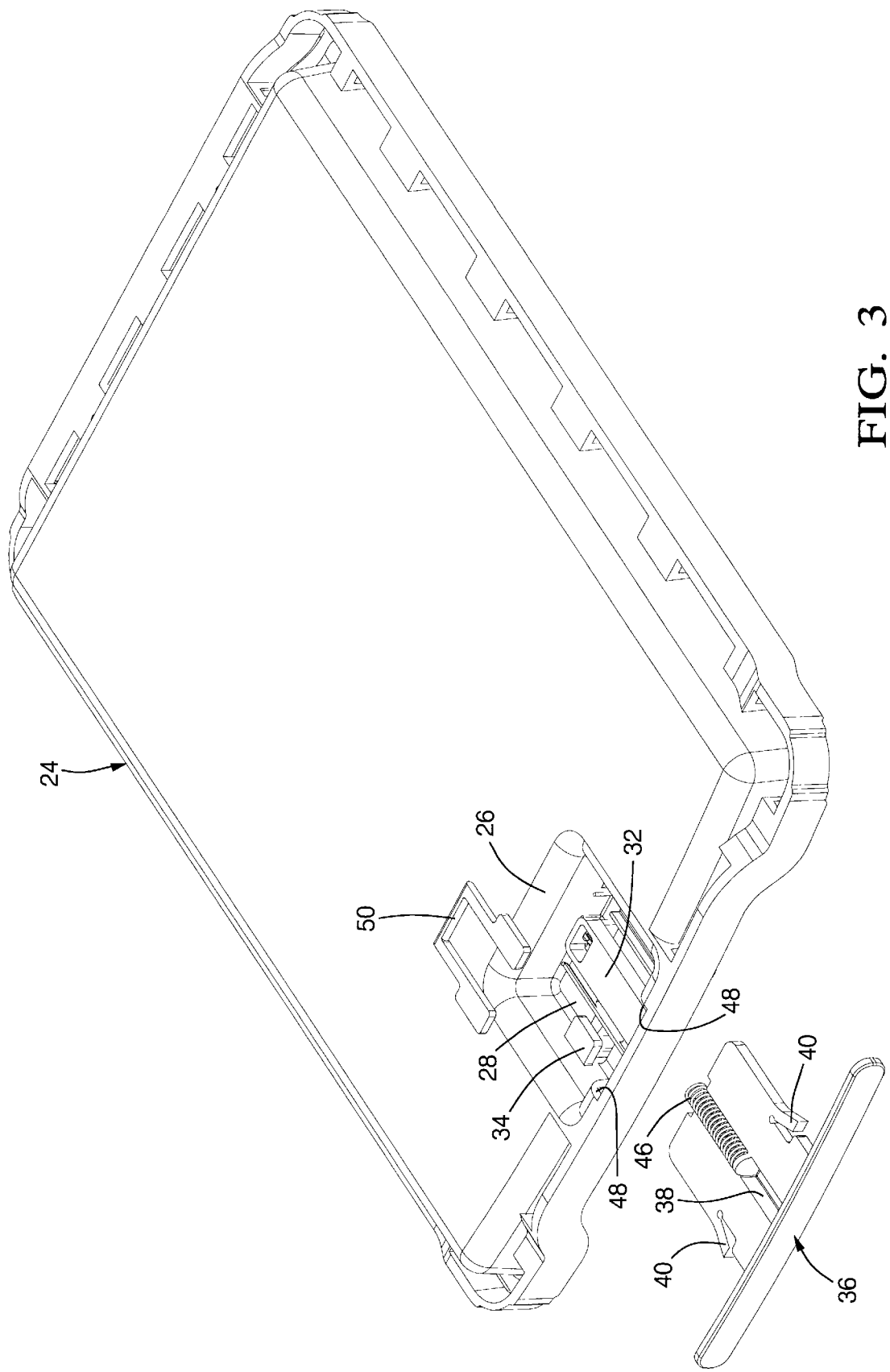

STORABLE VEHICLE ARM REST WITH IMPROVED LATCH BLOCK OUT

TECHNICAL FIELD

This invention relates to storable, container type arm rests for vehicle seats, and specifically to such an arm rest with an improved, low profile, fast acting mechanism to block the latch when the arm rest is raised, so as to prevent its lid from opening.

BACKGROUND OF THE INVENTION

Vehicle front seats often incorporate a combined arm rest (typically for the right arm of a driver) combined with an interior compartment. Typically, as shown in FIG. 1 of the drawings, an arm rest indicated generally at 10 has a hollow base 12 suitable for containing small items with a top lid 14 pivoted at the back and latched at the front. The arm rest 10 is operable as an arm rest when it is pivoted down to rest on the seat cushion, in the solid line position. The lid 14 can then be freely opened to insert or remove small items. It may also be raised up and of the way, as shown in dotted lines, flush against or even set into the seat back cushion. Because seat backs are reclined from the vertical, the raised position of the arm rest 10 is also reclined beyond absolute vertical, moving as much as 130 degrees up and back from the substantially horizontal use position when it is raised.

It is desirable that the lid 14 not open when the arm rest 10 has been raised, so the items in the base 12 cannot spill out. A known means for preventing undesired lid opening is a latch block out mechanism shown in co assigned U.S. Pat. No. 4,906,044 issued Mar. 6, 1990 to Wilstermann, and also shown in FIG. 1 of the drawings in the subject application. The latch disclosed there is a resilient hook 16 on the lid 14 that normally grabs a lip at the front of the hollow base 12, but which can be pulled out of the way by a pivoting lever 18 to release the lid 14. To disable the hook 16 from releasing when the arm rest 10 is in the raised position, a steel ball 20 is placed in an open topped pocket 22 in the arm rest base 12, just below the hook 16. If the base 12 is rotated up with the lid 14 closed, the ball 20 will roll out of the open topped pocket 22 and behind the hook 16, which is thereby blocked from being moved by the pivoting lever 18. A ball 20 rolling in an open topped pocket 20 is potentially subject to sticking, or even to being dislodged when the lid 14 is opened. An alternative embodiment disclosed in the same patent shows the ball hanging from a swinging pendulum pivoted to front edge of the base and below the hook, rather than rolling freely in a pocket. The ball pendulum is pivoted behind yet another free swinging pendulum, which it rotates and kicks up into a blocking position behind the hook when the arm rest is raised. This would obviate the possibility of dislodging a freely rolling ball out of a pocket, but involves extra parts. Both embodiments of the latch blocking mechanism disclosed in the patent require that a ball move over a fairly long path, either by rolling from one end of a pocket to another, or by swinging over 180 degrees on a pendulum. Both embodiments of the latch also consume space within the base, rather than entirely within the thinner lid. They also work only with the pivoting type of latch hook 16 shown, which is released by the rotating lever 18. Newer arm rest designs seek to contain the latch and its blocking mechanism entirely within the thinner lid. Block out mechanisms of the type found in briefcase lids and the like are of limited utility, because they deactivate the latch when the storage article is completely upside down, but not when it is nearly vertical, as here. An arm rest is never completely upside down, and must be blocked against opening when it is nearly vertical.

SUMMARY OF THE INVENTION

The invention provides a lower profile, quicker acting latch and block out mechanism that is contained entirely within the lid, and which works with a plunger type latch release. The block out mechanism moves incrementally over a very short path as the lid moves past absolute vertical.

In the preferred embodiment disclosed, a lid is pivoted to the back of a hollow base, and latched at the front. A shallow latch housing molded entirely within the thickness of the, near the front edge. A thin, flat, spring loaded plunger carries a hook that normally grabs a lip at the front of the base, but releases the lip when the plunger is pushed in against a compression spring. The lower surface of the plunger is notched, and moves parallel to a lower wall of the latch housing, with minimal clearance.

A thin, elongated flip lever is contained entirely between the notched lower surface of the plunger and a bottom wall of the latch housing. The back end of the flip lever is pivoted against the back of the housing, and its front end is aligned with the notch in the lower surface of the latch release plunger. When the arm rest is located in any position below absolute vertical, the thin flip lever rests against the latch housing lower wall, clear of the notch in the plunger, allowing the plunger to move freely. When the arm rest is raised, just as the lid passes past absolute vertical, the flip lever pivots away from its original position and falls under its own weight into the plunger notch, blocking the plunger from being pushed in to release the latch hook. The flip lever need move only a few degrees to do this, and so acts positively and quickly. The latch and its blocking lever together are very thin and low profile, contained entirely within the shallow housing in the lid. No parts are subject to sticking or dislodging.

BRIEF DESCRIPTION OF THE DRAWINGS

These and other features of the subject invention will appear from the following written description, and from the drawings, in which:

FIG. 2 shows a perspective view of the upper surface of the lid and latch housing of the invention, with the flip lever and spring loaded latch release plunger removed;

FIG. 3 is a view like FIG. 2, showing the latch components partially assembled;

DESCRIPTION OF THE PREFERRED EMBODIMENT

Figure 1:
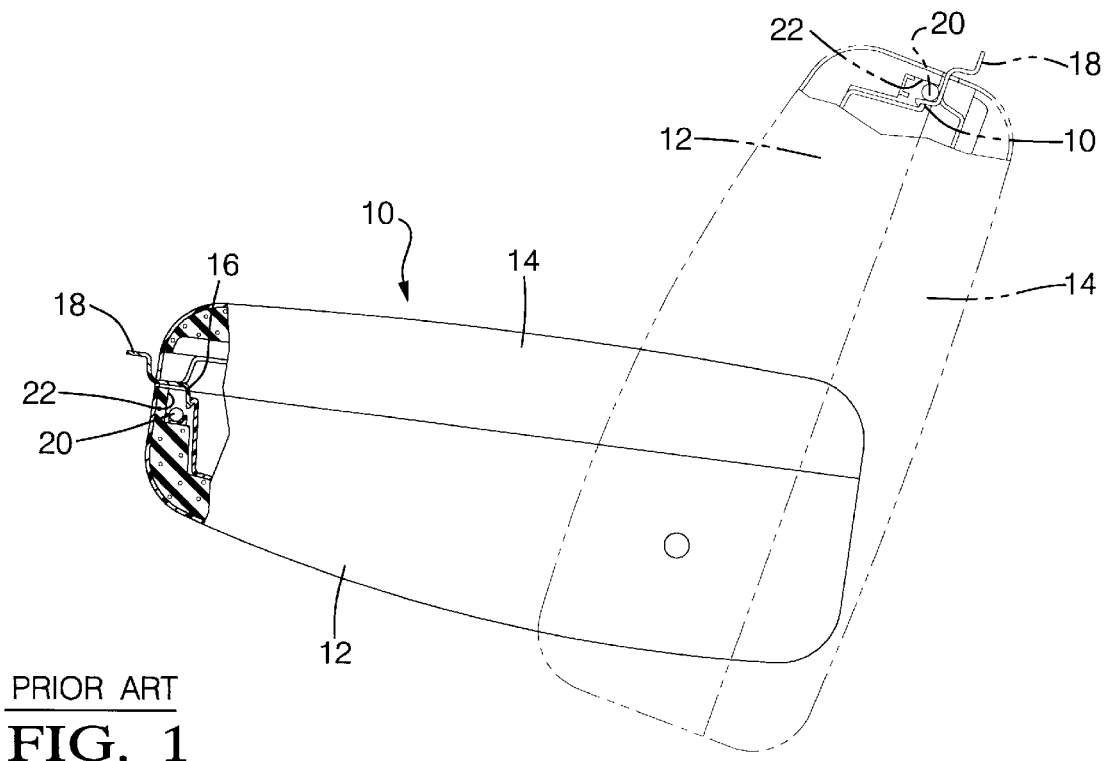
FIG. 1 shows the prior art latch block out mechanism described above.

Referring first to FIG. 1, the low profile lid latch and block out mechanism of the invention would be incorporated in an arm rest essentially the same as arm rest 10 noted above, with the same base 12 and pivoted lid 14. The difference lies in the fact that the latch and block out mechanism together are much more compact and thinner in profile, and incorporated entirely within the lid 14, as well as being faster and more positive acting.

Figure 4:
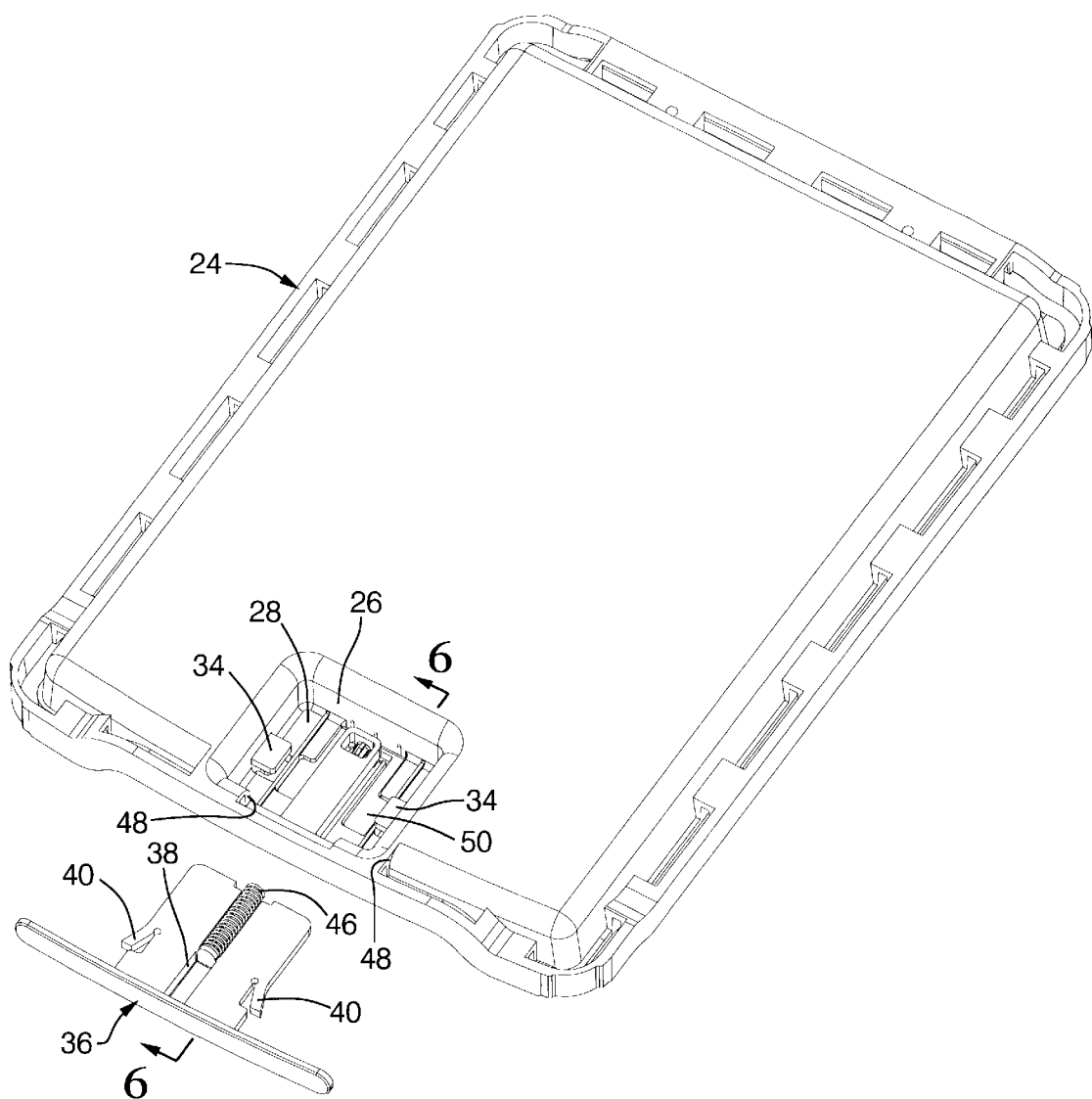
FIG. 4 a view like FIG. 2, showing the latch components further assembled.
Figure 5:
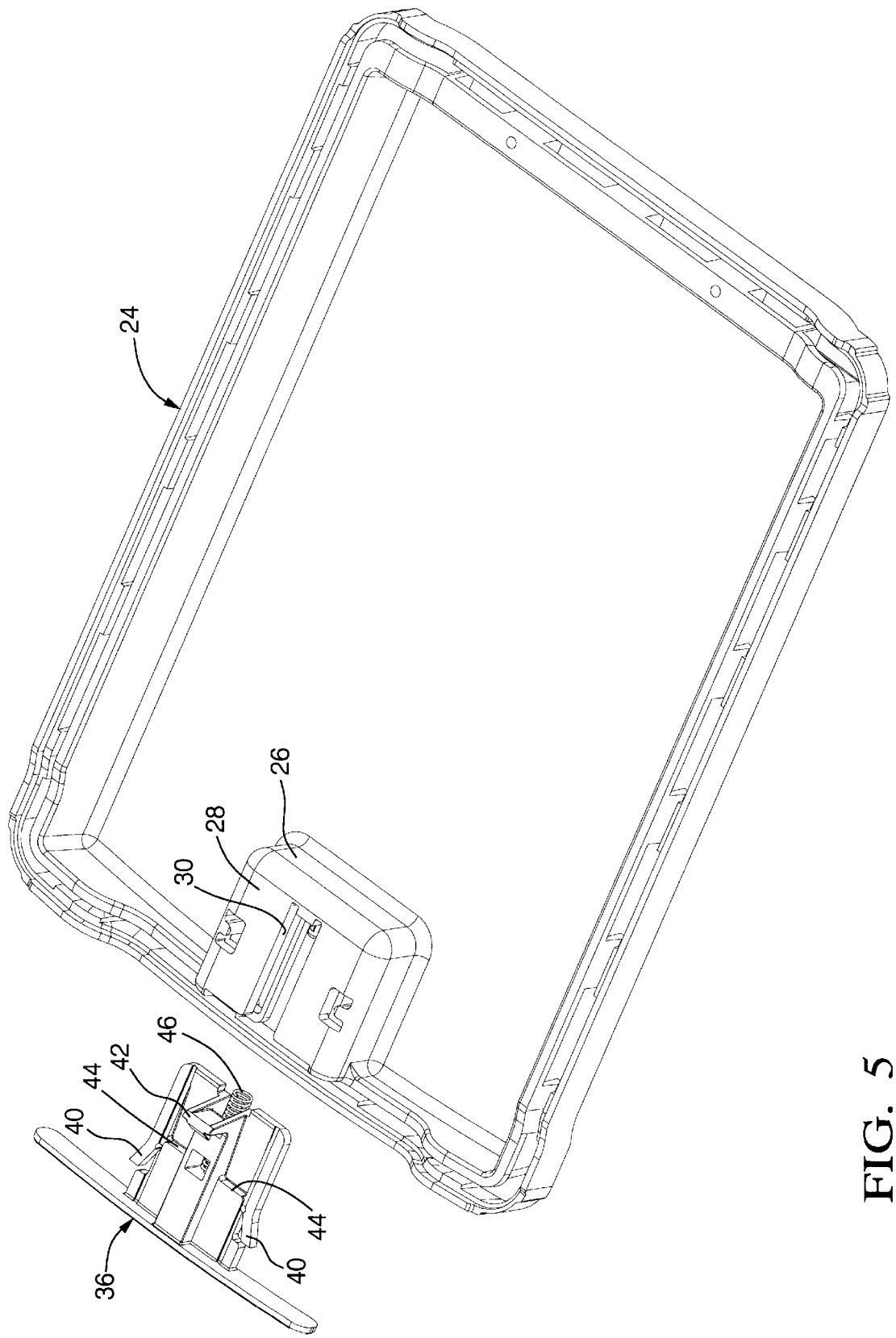
FIG. 5 is a view like FIG. 4, but showing the underside of the lid and plunger.

Referring next to FIGS. 2 through 5, the basic foundation or framework of the lid 14 is a hard plastic molded substrate, indicated generally at 24, which is ultimately covered by a foam padding. The molded substrate 24 is basically planar, with several structural features integrally molded into it. A shallow, well like latch housing 26 is molded near the front edge, and several integral features are molded into or through housing 26. A bottom wall 28 is inset from, but generally, coplanar to the lid substrate 24. The latch housing bottom wall 28, especially its outer surface, is best seen in FIG. 5, which shows the substrate 24 in perspective and from beneath. The center of latch housing bottom wall 28 is cut by an elongated, central guide channel 30. Above the bottom wall 28 and overlaying the guide channel 30 is a spring cover 32, molded integrally to wall 28 at its back end. Spaced to either side of spring cover 32 are a pair of guide posts 34, only one of which is visible in FIGS. 2 and 3, but both of which are visible in FIG. 4. The guide posts 34 are spaced apart far enough to match the side edges of a thin, hard plastic molded plunger, indicated generally at 36. While plunger 36 is basically flat, is has several integral structural features either protruding from it or inset into it. A central spring groove 38 opens through its upper surface and a pair of flexible fingers 40 standing out from the side edges. On the undersurface, the plunger 36 has a depending latch hook 42 sized to slide closely within the latch housing guide channel 30. To either side of the hook 42, a thin notch 44 is molded into the under surface of plunger 36, parallel to and close to the side edges. A compression spring 46 is sized to fit into the plunger spring groove 38, below the latch housing spring cover 32. To allow the installation of the plunger 36, an insertion window 48, with the same width as the plunger side edges, opens into the latch housing 26 through the front edge of the substrate 24, best seen in FIG. 4. The last component of the latch and block out mechanism of the invention is a flat, generally horseshoe shaped flip lever 50, made of metal or other suitably rigid material. The flip lever 50 fits down into the well shaped latch housing 26, resting flat against the inner surface of the bottom wall 28 with the bight of the horseshoe shape abutted against the back of the shallow housing 26 and the legs of the horseshoe shape bordering the spring cover 32, as best seen in FIG. 4. Once the flip lever 50 has been dropped in place, the spring 46 is set into the plunger spring groove 38, and the plunger 36 is inserted into the window 48 and between the guide posts 34 as the spring 46 moves beneath the spring cover 32. The spring 46 is compressed between plunger 36 and the end of the spring cover 32 until the resilient fingers 40 snap past the edges of the window 48 to trap plunger 36 in place in the latch housing 26.

Figures 6, 7:
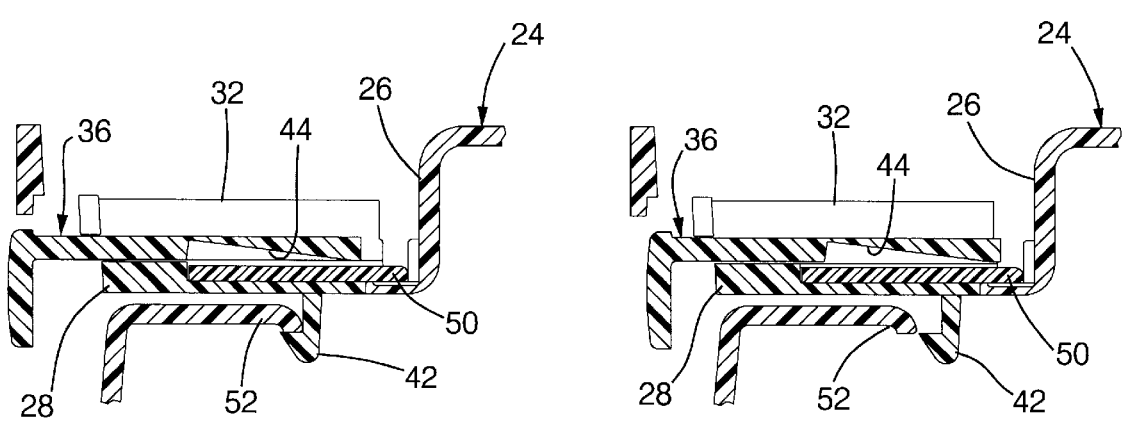
FIG. 6 is a cross section taken through line 6—6 of FIG. 4, when the arm rest is down and the lid is latched.
FIG. 7 is the same view as FIG. 6, with the latch released.

Referring next to FIGS. 6 and 7, the operation of plunger 36 after installation, when the arm rest 10 and lid 14 are in the lowered position, is illustrated. Plunger 36 can be pushed straight in and out within housing 26, guided by the guide posts 34. The spring 46 is compressed between the back of the spring cover 32 and plunger 36 it is pushed in, and, when released, plunger 36 is automatically pushed back out by spring 46 until the fingers 40 hit the edges of the window 48. As plunger 36 is pushed in and out, its undersurface moves parallel to and just above both the inner surface of the housing bottom wall 28 and the flip lever 50, with only the minimal clearance needed to avoid rubbing. Hook 42 slides concurrently back and forth within the guide channel 30. When plunger 36 is pushed out fully by the spring 46 to its normal, latched position, the latch hook 42 engages under a lip 52 at the front edge of the base 12, as seen in FIG. 6, which prevents the lid 14 from opening. However, the hook 42 and lip 52 face the opposite direction to the prior art latch described above. When lid 14 is open, hook 42 can be pushed back passively by camming past the lip 52 as the open lid 14 is shut. When lid 14 is closed, as in FIG. 6, hook 42 is released not by being rotated away from the lip 52, but by being pushed straight back and out from under lip 52 along with the plunger 36, as seen in FIG. 7. However, plunger 36 can be pushed in freely to its released position only when the latched lid 14 is either in the lowered position shown, or oriented somewhere between its lowered position and absolute vertical. In any such orientation, the flip lever 50 rests flat to the inner surface of the latch housing bottom wall 28, below the plunger 36 and clear of the plunger notches 44.

Figure 8:
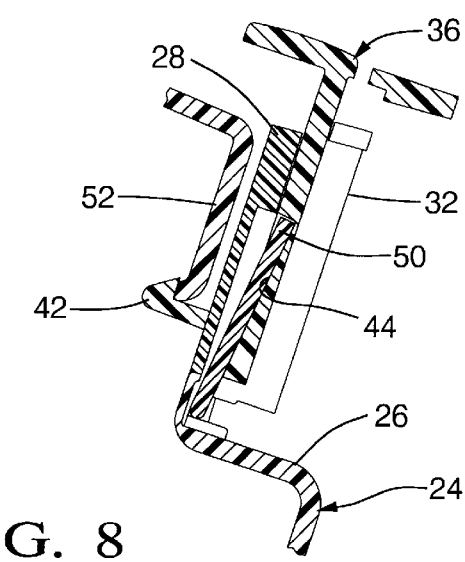
FIG. 8 shows the same cross section as FIGS. 6 and 7, but with the arm rest raised and the latch blocked.

Referring next to FIG. 8, it may be seen how the plunger 36 becomes disabled when the arm rest 10 is rotated up to its stored position. As this occurs, the lid 14 and all of the components carried by lid 14 pass absolute vertical. (The following description also applies when the lid 14 is merely opened and pivoted all the way from the base 12, but the disabling of the latch is merely incidental, in that case). As lid 14 is raised, the flip lever becomes unstable at the vertical position and then falls away from the inner surface of the latch housing bottom wall 28. The flip lever 50 pivots back about its abutted rear bight and its legs fall into the plunger notches 44, where it remains in a new stable position. Since the notches 44 in the undersurface of the plunger 36 are located directly above to the flip lever 50, with only the minimal clearance necessary to avoid rubbing, the flip lever 50 can pivot into the notches 44 very quickly, by falling and rotating only few degrees. There is no sticking or resistance to this motion, since the bight of the horseshoe shaped lever 50 sits freely against the back of the latch housing 2, with nothing to restrict its pivoting. Once the legs of the flip lever 50 have fallen into the notches 44, the plunger 36 is blocked and cannot be pushed in to release the latch hook 42, so the lid 14 cannot be opened. Although the legs of the flip lever 50 are thin, they would be strong when compressed along their length and pushed back into the rear of the latch housing 26, as would occur if the plunger 36 were inadvertently pushed in when the latched lid 14 was past vertical. The flip lever 50 falls just as quickly and easily back to its original stable position, resting against the latch housing bottom wall 28, when the latched lid 14 and arm rest 10 are lowered together back down. The flip lever 50 is trapped between the undersurface of plunger 36 and the latch housing bottom wall 28 at all times, able to pivot only over the few degrees clearance created by the notches 44, and cannot be dislodged or jammed.

In general, the entire latch and block out mechanism disclosed, with the substantially shallow latch housing 26, substantially flat bottom wall 28 co planar to the lid 14, substantially flat plunger 36 and the thin, flat lever 50 trapped therebetween, is very compact and low in profile, as measured in a direction normal to the plane of the lid substrate 24. The flip lever 50 is accommodated between the plunger 36 and the co planar bottom wall 28 within the thickness of those parts themselves, with no extra space needed. Even the spring 46 is accommodated almost entirely within the groove 30 in plunger 36, with very little extra space needed. Therefore, all of the latch and block out mechanism components are accommodated and contained within the existing thickness of the lid substrate 24. Variations in the disclosed embodiment could be made, however. The flip lever 50 is disclosed as being substantially coplanar to the plunger 36 and latch housing bottom wall 28, trapped closely between them in a very thin and compact configuration. As a consequence, when the arm rest 10 and lid 14 are in their substantially horizontal use position, so is the flip lever 50. Consequently, the arm rest 10 and its lid 14 must move past absolute vertical before the flip lever 50 can fall over and disable the plunger 36. However, if the flip lever were to be placed under the plunger 36 at an initial angle thereto, say thirty degrees, then the arm rest 10 would have to move only past sixty degrees in order to cause the lever 50 to fall to its blocking position. That would not give the most compact and "flat" configuration, however. Whatever its initial angle, a flip lever could have a simple, straight shape, rather than the horseshoe shape, and be located on only one side of the hook 42 and designed to drop into only one notch 44. It might have to be wider or thicker than a single leg of the horseshoe shaped lever 50 in order to have enough stiffness. The horseshoe shape of the flip lever 50 as disclosed cooperates in creating a particularly thin and compact overall mechanism, however. The spring 46 sits below the centrally located cover 32, within the central groove 38 in plunger 36, which in turn is just above the hook 42 that moves within the central guide channel 30. These centrally located structural features, which cooperate to guide and bias the plunger 36, occupy a minimal thickness, all within the latch housing 26. Moreover, the horseshoe shaped flip lever 50, by straddling this central stack of overlaying structural features (spring cover 32, spring 46, spring groove 38, hook 42 and guide channel 30), is able to use otherwise unoccupied space, and fit very compactly into the overall package within the latch housing 26 and lid substrate 24. Theoretically, a double, parallel configuration of these features, i.e., two springs 46, two hooks 42 and two guide channels 30, could straddle a centrally located, straight flip lever that fell into a single, central notch on the undersurface of the plunger 36. However, the part count is reduced by providing the single, double legged lever 50 as disclosed. The two notches 44 into which the horseshoe shaped lever 50 falls provide an evenly balanced and stable blocking action when the plunger 36 is attempted to be pushed in. Therefore, it will be understood that it is not intended to limit the invention to just the embodiment disclosed.

We claim:

1. In a vehicle arm rest having a hollow base and a pivoted upper lid that is raised with said base from a substantially horizontal position and past absolute vertical to a stored position, a low profile lid latch with a fast acting latch block out mechanism, comprising, a latch housing contained entirely within said lid and having a substantially flat bottom wall, a substantially flat plunger slidably contained and movable straight back and forth within said latch housing along said bottom wall, from a latched position hooked to said base to a released position, said plunger having a notched undersurface located just above said bottom wall, and, a substantially flat flip lever freely pivoted to said latch housing and contained between said latch housing bottom wall and said notched plunger undersurface so as to rest against said bottom wall in alignment with said notched undersurface when said arm rest is in any position between its lowered position and absolute vertical, whereby, when said arm rest is any position between its lowered position and absolute vertical, said flip lever remains against said latch housing lower wall, allowing said plunger to slide freely, and when said arm rest moves toward its stored position and past absolute vertical, said flip lever pivots quickly and freely away from said latch housing bottom wall and into said plunger notched undersurface, thereby blocking said plunger from moving to its released position.

2. In a vehicle arm rest having a hollow base and a pivoted upper lid that is raised with said base from a substantially horizontal position and past absolute vertical to a stored position, a low profile lid latch with a fast acting latch block out mechanism, comprising, a latch housing contained entirely within said lid and having a substantially flat bottom wall that is substantially coplanar to said lid with an elongated central guide channel opening therethrough, a substantially flat plunger having a depending latch hook slidably contained and movable straight back and forth within guide channel from a latched position hooked to said base to a released position, said plunger also having a pair of notches defined in said undersurface located to either side of said central guide channel and just above said latch housing bottom wall, and, a substantially flat, generally horseshoe shaped flip lever having a bight freely pivoted to said latch housing and a pair of parallel legs located to either side of said central guide channel and between said latch housing bottom wall and said plunger notches so as to rest against said bottom wall co planar thereto and in alignment with said notches when said arm rest is in any position between its lowered position and absolute vertical, whereby, when said arm rest is any position between its lowered position and absolute vertical, said flip lever remains against said latch housing lower wall, allowing said plunger to slide freely, and when said arm rest moves toward its stored position and past absolute vertical, said flip lever pivots quickly and freely about its bight away from said latch housing bottom wall as its legs move into said plunger notches, thereby blocking said plunger from moving to its released position.

3. In a vehicle arm rest having a hollow base and a pivoted upper lid that is raised with said base from a substantially horizontal position and past absolute vertical to a stored position, a low profile lid latch with a fast acting latch block out mechanism, comprising, a latch housing contained entirely within said lid and having a substantially flat bottom wall with a central guide channel opening therethrough and a spring cover overlaying said guide channel above said bottom wall, a substantially flat plunger having a depending latch hook slidably contained and movable straight back and forth within guide channel from a latched position hooked to said base to a released position, said plunger also having a central spring groove opening into its upper surface and pair of notches defined in said undersurface located to either side of said central guiding groove and just above said latch housing bottom wall, a compression spring located in central spring groove and compressible within said groove and beneath said spring cover as said plunger moves inwardly, and, a substantially flat, generally horseshoe shaped flip lever having a bight freely pivoted to said latch housing and a pair of parallel legs located to either side of said central guide channel, spring, and overlaying spring cover and also located between said latch housing bottom wall and said plunger notches so as to rest against said bottom wall in alignment with said notches when said arm rest is in any position between its lowered position and absolute vertical, whereby, when said arm rest is any position between its lowered position and absolute vertical, said flip lever remains against said latch housing lower wall, allowing said plunger to slide freely, and when said arm rest moves toward its stored position and past absolute vertical, said flip lever pivots quickly and freely about its bight away from said latch housing bottom wall as its legs move into said plunger notches, thereby blocking said plunger from moving to its released position.

* * * * *